(No Model.) 2 Sheets—Sheet 1.

H. POOLE.
BROOM CORN SEED STRIPPER.

No. 434,069. Patented Aug. 12, 1890.

Witnesses:
T. R. Stuart
S. J. Mills

Inventor:
Henry Poole,
By Marble + Mason,
Att'ys.

(No Model.) 2 Sheets—Sheet 2.
H. POOLE.
BROOM CORN SEED STRIPPER.

No. 434,069. Patented Aug. 12, 1890.

Witnesses:
T. R. Stuart,
A. J. Mills

Inventor:
Henry Poole,
By Marble & Mason,
Att'ys.

UNITED STATES PATENT OFFICE.

HENRY POOLE, OF BATTLE HILL, ASSIGNOR OF ONE-THIRD TO JOHN H. PRESCOTT, OF SALINA, KANSAS.

BROOM-CORN-SEED STRIPPER.

SPECIFICATION forming part of Letters Patent No. 434,069, dated August 12, 1890.

Application filed June 15, 1888. Serial No. 277,279. (No model.)

*To all whom it may concern:*

Be it known that I, HENRY POOLE, a citizen of the United States, residing at Battle Hill township, in the county of McPherson and State of Kansas, have invented certain new and useful Improvements in Seed-Strippers for Broom-Corn; and I do hereby declare the following to be a full, clear, and exact description of the invention, such as will enable others skilled in the art to which it appertains to make and use the same.

My invention relates, generally, to seed-strippers for broom-corn, and particularly to a seed-stripper which can be used separately, but which is adapted to be combined with a broom-corn harvester of the character disclosed in another application for Letters Patent filed by me March 13, 1889, Serial No. 303,083, in which is shown and described, but only claimed in combination, a seed-stripper which involves the same principle or mode of operation as the present one. In the invention presented in said application is combined in a single machine cutting, conveying, assorting, recutting, and seed-stripping mechanisms, all being mounted upon a single main axle, upon which revolve two drive-wheels which not only carry said mechanisms, but impart simultaneous motion to the various movable parts thereof.

My invention consists in the improved construction and arrangement or combination of parts, hereinafter fully disclosed in the description and claims.

The objects of my invention are, first, to provide improved feed mechanism for carrying the heads or brushes of broom-corn to the seed-stripping mechanism; second, to provide improved seed-stripping mechanism, which consists, mainly, of two toothed stripping rollers or cylinders for stripping or cleaning the seed from the heads or brushes of broom-corn, and of a spiked or toothed feed-wheel for holding said heads or brushes by their butt-ends and presenting their front or seed-bearing ends to said stripping rollers or cylinders; third, to provide improved discharge mechanism for carrying the stripped or cleaned heads or brushes away from said stripping mechanism and out of the machine for binding or bundling or such other disposition as may be desired, and, fourth, to provide improved means for supporting, carrying, and operating said seed-stripping mechanism.

Figure 1:
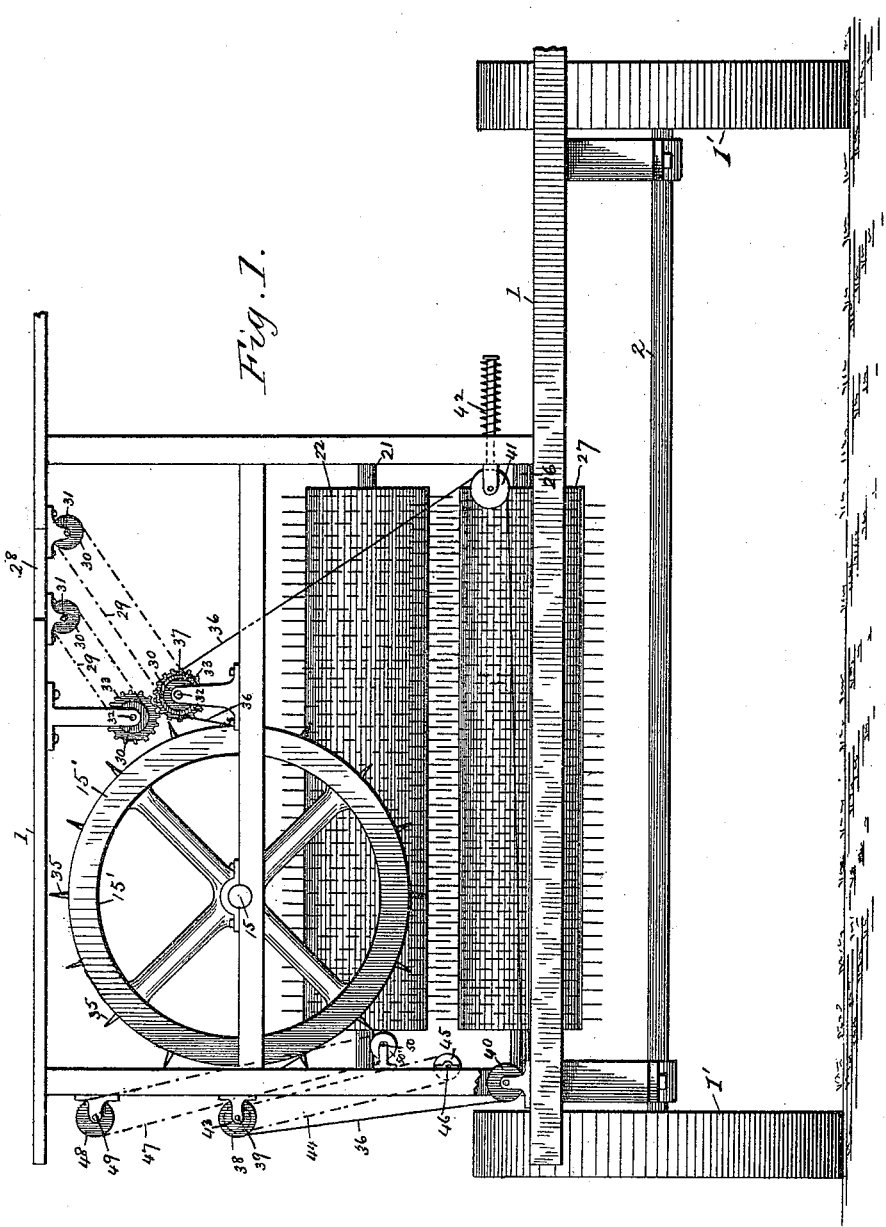
Figure 2:
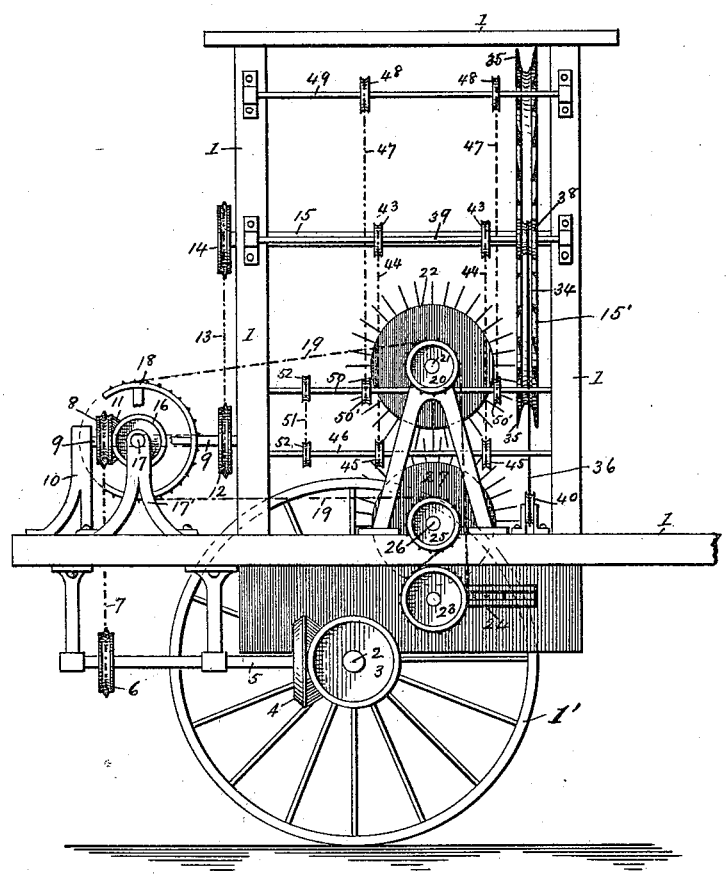

In the accompanying drawings, forming a part of this specification, and in which the same reference-numerals indicate the same parts, Figure 1 represents a side elevation of my improved seed-stripper, the same being used in connection with a broom-corn harvester, the rear wall of the casing being omitted to show interior parts, and Fig. 2 an end elevation of the same.

In the drawings, the numeral 1 indicates the main frame of my improved seed-stripper, which in this instance is illustrated in connection with part of a broom-corn harvester, which is mounted upon two wheels, which are journaled upon a single drive-shaft 2, from which power is transmitted for operating the seed-stripping mechanism, but which may also be journaled in stationary bearings and operated from any suitable source of power. To this main or drive shaft, as shown in Fig. 2, is secured a bevel-wheel 3, which meshes with a bevel-pinion 4, secured upon a shaft 5, which extends forward and is provided at its front end with a sprocket-wheel 6, around which passes a sprocket-chain 7, which passes around a sprocket-wheel 8, secured upon a short shaft 9, which is journaled at its front end in a bracket 10 and at its rear end in the forward side of the casing 1, and has a bevel-wheel 11 and another sprocket-wheel 12 secured thereon. A chain 13 passes around said sprocket-wheel 12 and around a wheel 14 upon the forward end of a shaft 15, upon which is secured and driven a large spiked feed-wheel 15'. The bevel-wheel 11 meshes with a bevel-wheel 16 upon a shaft 17, journaled in suitable bearings in brackets 17' in front of the casing 1 and parallel with the same, and the outer end of this shaft has a large chain-wheel 18 secured thereto. A chain 19 passes around this wheel, around a wheel 20 upon the end of a transverse shaft 21 of an upper spiked or toothed seed-stripping roller or cylinder 22, thence down and under an idler-wheel 23, the shaft or stud of the same being adjustably secured in ways 24 for the purpose of taking up slack in the chain, thence over a pulley 25 upon the end of a transverse shaft 26 of a lower spiked or toothed seed-stripping roller or cylinder 27, and thence back to the wheel 18.

The top of the casing 1 is formed with a feed-opening 28 at its middle, from which lead two inclined endless conveyers or carriers 29, which are arranged one above the other, and consist each of two chains or belts passing around wheels or pulleys 30 upon shafts 31 and 32. The lower shafts 32 of said carriers are provided with intermeshing cog-wheels 33.

The large feed-wheel 15', provided with a grooved periphery 34 and radiating pairs of spikes or teeth 35, is mounted upon the shaft 15, which is journaled in bearings in the front and rear sides of the casing 1. A belt or cable 36 passes under the lower half of this feed-wheel and between its pairs of spikes or teeth. This cable also passes over a pulley 37 upon the lower shaft 32 of the endless carrier, thence down and around the lower portion of the feed-wheel 15', thence over a pulley 38 upon a shaft 39, which is also journaled in bearings on the front and rear sides of the casing 1, thence under a guide-pulley 40, thence under a guide-pulley 41, which is secured in a tension-regulating spring-support 42, and thence back to the pulley 37 and the feed-wheel.

The shaft 39 on the left side of the casing 1 is provided with two wheels 43, over which pass the endless chains or bands 44 of a lower inclined endless carrier, said chains or bands passing under wheels 45 upon a shaft 46. The chains 47 of an upper inclined endless carrier pass around wheels 48 upon an upper shaft 49, and are revolved from the lower shaft 50 of said carrier by means of the wheels 50' and a chain 51, which passes around wheels 52 upon the lower shaft 46 of the lower carrier and the lower shaft 50 of the upper carrier.

The operation of my improved machine is as follows: The heads or brushes of the broom-corn are fed by an attendant through the opening 28 in the top of the casing 1, whence they are conveyed by the inclined carriers 29 to the feed-wheel 15', when their butt-ends will be clamped between the belt or cable 36 and the grooved periphery 34 of said wheel, each pair of the spikes or teeth of said wheel separating a suitable portion of the heads or brushes. Then said feed-wheel will carry the heads or brushes down into contact with the spiked stripping rollers or cylinders and present them to the space between the same whereupon they will strip off the seed and permit it to drop down into the machine. The feed-wheel and cable travel very slowly, while the stripping-rollers revolve at a high rate of speed, so that the heads or brushes, when they are presented to and held a sufficient time between said rollers, will be perfectly stripped of their seed. The cleaned heads or brushes are next carried upward by the belt or cable and feed-wheel, when, as said cable passes off to one side and over the pulley 38, the cleaned heads or straw will be delivered to the carrier-chains 44 and 47, which will convey them upward and discharge them at the end of the machine in gavels upon the ground, into a suitable receptacle, or a self-binding attachment, as may be desired.

Having thus fully disclosed the construction and arrangement or combination of the several parts of my invention and the operation of the same, what I claim as new is—

1. In a seed-stripper, the combination of a casing formed with a feed-opening, endless feed-carriers arranged one above the other and beneath said opening, a feed-wheel having a grooved periphery and pairs of spikes or teeth thereon, a belt or cable passed partly around the periphery of said wheel, two toothed stripping rollers or cylinders arranged at the side of said feed-wheel, and suitable operating mechanism for said cylinders, substantially as described.

2. In a seed-stripper, the combination, with two seed-stripping rollers, of a feed-wheel journaled at right angles to said rollers, formed with a grooved periphery and provided with pairs of radiating spikes or teeth thereon, suitable guide-pulleys, and a belt or cable carried around a part of said feed-wheel, opposite said stripping-rollers, between said pairs of spikes or teeth and around said guide-pulleys, said belt or cable being adapted to clamp the butt-ends of the heads or brushes of the corn against the periphery of said wheel and present the front ends thereof to the space between said stripping-rollers, substantially as described.

3. In a seed-stripper, the combination of a casing formed with a feed-opening, endless feed-carriers arranged one above the other and beneath said opening, two seed-stripping rollers or cylinders, a feed-wheel arranged at right angles to said rollers, formed with a grooved periphery and provided with pairs of radiating spikes or teeth thereon, suitable guide-pulleys, and a belt or cable carried around a part of said feed-wheel, opposite said stripping-rollers, between said pairs of spikes or teeth and around said guide-pulleys, said belt or cable being adapted to clamp the butt-ends of the heads or brushes of the corn against the periphery of said wheel and present the front ends thereof to the space between said stripping-rollers, substantially as described.

4. In a seed stripper, the combination, with a pair of horizontal toothed seed-stripping rollers, of a grooved feed-wheel provided with pairs of spikes or teeth on its periphery and journaled at right angles to said rollers, with the lower part of its periphery registering with the space between said rollers, guide-pulleys arranged at both sides of and below said feed-wheel, and a belt or cable passed around said pulleys and around the lower portion of said wheel, between the pairs of spikes or teeth upon the same, substantially as described.

5. In a seed-stripper, the combination of a casing formed with a feed-opening, endless feed-carriers arranged one above the other and beneath said opening, a pair of toothed seed-stripping rollers, a grooved feed-wheel provided with pairs of spikes or teeth on its periphery and journaled at right angles to said rollers, with the lower part of its periphery registering with the space between said rollers, guide-pulleys arranged at both sides of and below said feed-wheel, and a belt or cable passed around said pulleys and around the lower portion of said wheel, between the pairs of spikes or teeth upon the same, substantially as described.

6. In a seed-stripper, the combination of a casing formed with a feed-opening, endless feed-carriers arranged one above the other and beneath said opening, a pair of toothed seed-stripping rollers, a grooved feed-wheel provided with pairs of spikes or teeth on its periphery, a belt or cable passed around the lower portion thereof and around guide-pulleys, and upwardly-inclined endless discharge-carriers, substantially as described.

7. In a seed-stripper, the combination of a casing formed with a feed-opening, downwardly-inclined endless feed-carriers arranged one above the other and beneath said opening, a feed-wheel provided with pairs of spikes or teeth, a pair of toothed seed-stripping rollers, upwardly-inclined endless discharge-carriers, and mechanism for connecting and simultaneously operating said feed-carriers, feed-wheel, stripping-rollers, and discharge-carriers, substantially as described.

8. In a seed-stripper for broom-corn, the combination, with a main frame, a single drive-shaft, and two wheels mounted thereon, of seed-stripping mechanism supported and carried upon said main frame, drive-shaft, and wheels, and gearing for connecting said seed-stripping mechanism to and operating the same from said single drive-shaft, said seed-stripping mechanism consisting of a pair of toothed rollers, and said gearing including the sprocket-wheel 18, the endless sprocket-chain 19, and the sprocket-wheels 20, 23, and 25, substantially as described.

9. In a seed-stripper for broom-corn, the combination, with a main frame, a single drive-shaft, and two wheels mounted thereon, of seed-stripping mechanism supported and carried upon said main frame, drive-shaft, and wheels, and gearing for connecting said seed-stripping mechanism to and operating the same from said single drive-shaft, said seed-stripping mechanism consisting of a pair of toothed rollers, and said gearing including the sprocket-wheel 18, the endless sprocket-chain 19, and the sprocket-wheels 20, 23, and 25, the bevel-wheels 11 and 16, the sprocket-wheels 8 and 6, the chain 7, the shaft 5, the bevel-wheels 4 and 3, the single drive-shaft 2, and the two wheels 1', substantially as described.

10. In a seed-stripper, the combination of a pair of downwardly-inclined endless feed-carriers, a feed-wheel arranged parallel with said carriers at the lower ends of the same and provided with pairs of spikes or teeth upon its periphery, a pair of toothed seed-stripping rollers or cylinders journaled at right angles to said feed-wheel and having a space between them registering with the lower portion of the periphery of said feed-wheel, a guide-pulley upon the lower shaft of the lower carrier, a guide-pulley at the opposite side of said feed-wheel, a spring-supported guide-pulley below said wheel, a guide-pulley opposite the last-named pulley, a pair of upwardly-inclined endless discharge-carriers, and a belt or cable passed around the lower portion of said feed-wheel between the spikes or teeth and around said guide-pulleys, substantially as described.

In testimony whereof I affix my signature in presence of two witnesses.

HENRY POOLE.

Witnesses:
ANDREW SHARPE,
HEBER SMITH.